United States Patent Office 3,065,605
Patented Nov. 27, 1962

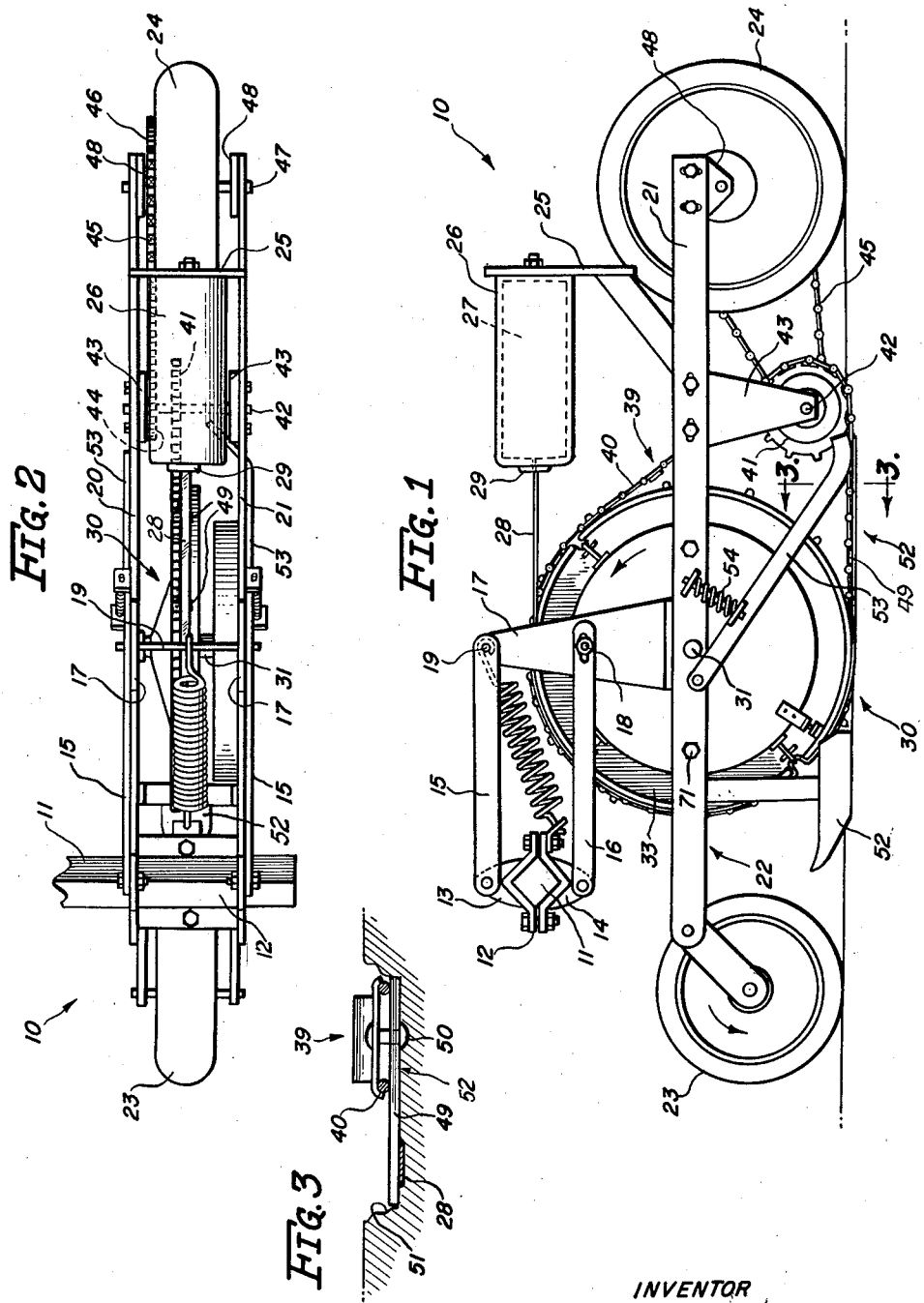

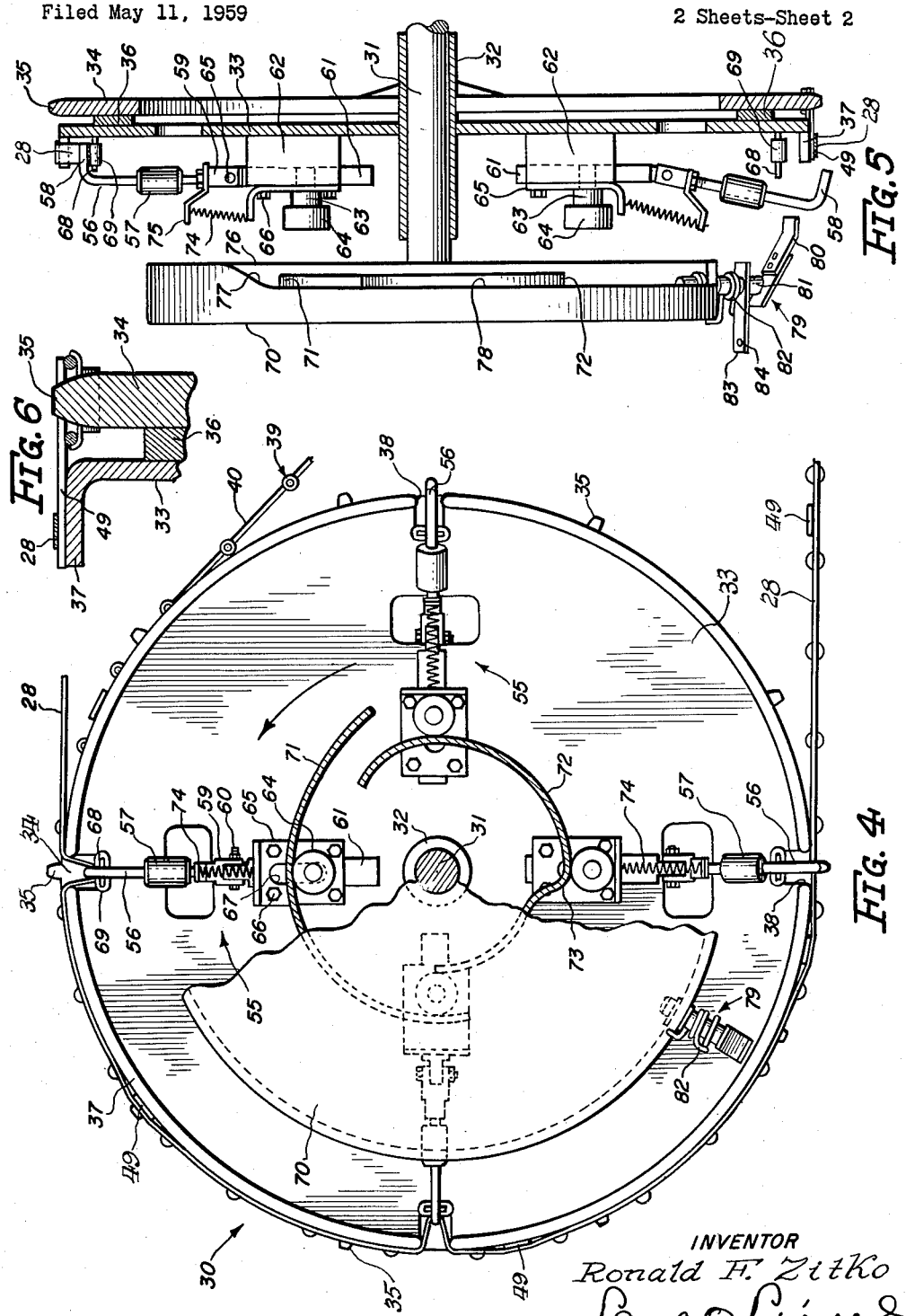

3,065,605
SEED TAPE PLANTER
Ronald F. Zitko, Cicero, Ill., assignor to International Harvester Company, Chicago, Ill., a corporation of New Jersey
Filed May 11, 1959, Ser. No. 812,420
2 Claims. (Cl. 61—72.6)

This invention relates to agricultural implements and particularly to planters. More specifically, the invention concerns an improved planter for seed containing strands such as ribbon, tape and the like.

In planting seed tape and the like the tape is laid on the ground in a furrow and covered with a layer of dirt. Due to the lightness of the material in which the seed is imbedded it is easily caught by the wind before it can be covered with soil and is disarranged, resulting in non-uniform planting.

An object of this invention is the provision of an improved seed tape planter wherein novel means are provided for holding the tape on the ground or in a furrow after it is deposited and until it is covered with soil.

Another object of the invention is the provision, in a planter for seed tape and the like wherein the tape is looped around a feed wheel and laid on the ground during the forward progress of the feed wheel, of novel means for driving the feed wheel including means forming a peripheral surface about which the tape is wound and further constituting means by which the tape is pressed into the ground.

Another object of the invention is the provision, in a planter for seed tape and the like, of a ground-engaging feed wheel adapted to receive the tape and deposit it upon the ground, and in combination therewith a drive wheel having an endless chain connection with the feed wheel to drive the latter, the lower chain flight between said wheels being parallel to and engageable with the ground to hold the tape in the ground after it leaves the feed wheel and until it is covered with soil.

Other objects and advantages of the invention will become clear from the following detailed description when read in conjunction with the accompanying drawings, wherein:

FIGURE 1 is a view in side elevation of a seed tape planter unit embodying the features of this invention mounted upon a tool bar of the type adapted to be carried or propelled by a tractive vehicle;

FIGURE 2 is a plan view of the structure shown in FIGURE 1;

FIGURE 3 is an enlarged sectional detail showing the manner in which the tape is held in the ground by lug projections on the drive chain for the feed wheel;

FIGURE 4 is an enlarged view in side elevation of the feed wheel, with parts broken away to show the clamping apparatus for holding the tape on the peripheral surface of the wheel and releasing the tape when the clamping means has reached a location adjacent the ground;

FIGURE 5 is a sectional view of the feed wheel shown in FIGURE 4, with the parts spaced somewhat to show the relationship therebetween, and FIGURE 6 is an enlarged sectional detail of a portion of the periphery of the feed wheel showing the peripheral teeth and the rim, and the relationship of the drive chain thereto.

In the drawings, the numeral 10 designates a one-row planter unit mounted on a transversely extending tool bar 11 adapted to be carried by a tractor or the like. Although only one such planter unit is shown, it may be understood that for multiple row planting a plurality of planting units 10 may be mounted at laterally spaced locations on the tool bar. The planter unit is mounted upon the tool bar through the intermediary of a clamp 12 having a laterally spaced pair of upstanding and depending ears 13 and 14 to which are pivotally connected the forward ends of laterally and vertically spaced pairs of parallel links 15 and 16, respectively. The rear ends of links 15 and 16 are pivotally connected to standards 17 by separate lower pin and slot connections 18 and a single transverse pin 19 extending between the standards.

The planter unit 10 includes laterally spaced longitudinally extending frame bars 20 and 21 to the lower ends of which standards 17 are affixed, as by welding. The bars 20 and 21 form parts of a supporting frame 22 carrying a wheel 23 at its forward end and a wheel 24 at its rear end.

A bracket 25 is secured to and extends upwardly from the bars 20 and 21, and secured to the bracket is a cylindrical container 26 in which is received a spool 27 of a continuous tape of cellulosic or other suitable material 28 in which seed and the like is embedded. The tape 28 is withdrawn from the interior of spool 27 through an outlet 29 and is directed to a feed wheel 30 rotatably mounted upon a transverse shaft 31 extending between the frame bars 20 and 21.

Feed wheel 30 comprises a hub 32 and a main body portion in the form of a disk 33 to the outer face of which is secured an annular driving member in the form of a ring 34 having peripheral teeth 35 separated from the main body 33 by a spacer 36.

A flange 37 extending inwardly from the main body 33 forms a rim about the periphery of the wheel having a plurality of openings 38 spaced thereabout, the purpose of which will hereinafter become clear.

The feed wheel is driven from the rear wheel 24 through the intermediary of a drive chain 39 composed of articulated links 40 engageable with the sprockets or teeth 35.

Chain 39 is an endless chain trained around the periphery of feed wheel 30 and also trained around a sprocket wheel 41 spaced rearwardly from wheel 30 and mounted adjacent the ground on a transverse shaft 42 carried at the lower ends of a pair of depending plates 43 affixed to frame bars 20 and 21. Another sprocket wheel 44, mounted on shaft 42 is drivingly connected by a chain 45 with a sprocket wheel 46 secured to the shaft 47 of wheel 24 supported in brackets 48 secured to the rear end of the frame bars 20 and 21.

Secured to the chain 39 at locations spaced approximately each five links, are a plurality of laterally projecting lugs or bars 49 secured at one end to the outer surface of the link by one or more rivets 50, as clearly shown in FIGURE 3.

As shown in FIGURES 5 and 6, laterally projecting bars 49 span the gap between sprocket ring 34 and main body 33 of the feed wheel 30 and are substantially coincident with the length of rim 37 and rest upon it.

Tape 28 withdrawn from the supply source represented by spool 27 carried in container 26, is directed to the rim 37 laterally spaced from the sprockets 35 and links 40 of chain 39 and is trained around the rim on the outside of bars or lugs 49. The tape is continuously deposited in the furrow 51 formed by a furrow opener 52 carried by the frame bars 20 and 21, and is pressed into the furrow to anchor the tape to the ground, by the lugs 49.

As shown in FIGURE 3, a horizontal flight 52 of chain 39 is provided parallel to and in contact with the ground between feed wheel 30 and sprocket wheel 41, so that the tape is held in the ground until covered with soil by covering members 53 pivotally connected to the frame bars 20 and 21 and extending rearwardly therefrom on opposite sides of the furrow to a location adjacent the sprocket wheel 41 to cover the tape in the furrow. The rear wheel 24 is preferably rubber tired and serves as a press wheel to firm the soil over the tape. The covering members 53 are resiliently urged toward the ground by springs 54 connected between the cover members and the respective frame bars 20 and 21.

Seed tape trained around feed wheel 30 is grasped and held to the periphery of the wheel by clamping apparatus designated at 55 and clearly shown in FIGURES 4 and 5 and further described and claimed in co-pending U.S. application Serial No. 781,732, filed December 19, 1958. Clamping units 55 are provided at circumferentially spaced locations on the main body 33 of the feed wheel, each in radial alignment with one of the openings 38 in the rim 37. It should also be understood that these clamping units are substantial duplicates, and a description of one will suffice for all.

Each of the clamping devices 55 comprises a finger 56 having a roller 57 mounted thereon and having its upper end bent into a hook 58. The radially inner end of the finger is anchored to a clevis 59 mounted on a pivot pin 60 carried at one end of a reciprocable slide member 61 slidably receivable in a mating opening provided in a block 62 affixed to the inner face of the main body 33 of the feed wheel.

Slidable member 61 is an elongated bar having a stub shaft 63 mounted in and extending at right angles therefrom and having mounted upon its end a roller 64. A cover plate 65 is secured to the surface of block 62 by a plurality of bolts 66, and is provided with a slot 67 to slidably receive stub shaft 63.

Bar 61 is slidable parallel to the face of disk portion 33 of the wheel to move finger 56 from a position with the hook 58 projecting through its associated opening 38, as indicated at the bottom of FIGURE 4, to a retracted position with finger 56 withdrawn within the rim 37 and with the hook portion 58 of the finger engaging a stop member 68, one of which is mounted on the disk 33 just below each of the openings 38 in the rim 37. Stop member 68 is provided with a flexible covering or sleeve 69, preferably of rubber or the like to minimize the danger to the tape to be pressed against it by the finger 56.

Mechanism is provided for reciprocating the slidable bar 61 in block 62 to extend and retract finger 43. This mechanism is in the form of a disk shaped member 70 mounted on shaft 31 and affixed to side frame bar 21 by bolts 71. A pair of cam tracks 71 and 72 are affixed to the inner face of member 70 to project inwardly therefrom for engagement with roller 64 of the respective clamping elements 55.

In FIGURE 5 the disk shaped member 70 is shown spaced from the wheel disk 33 and with cam roller 64 out of engagement with cam tracks 71 and 72. In FIGURE 4 the cam roller 64 of upper clamping unit 55 is shown engaging the inner face of the upper cam track 71. In this position finger 56 has been retracted to grasp a section of the tape 23, draw it inwardly against the stop 68 and hold it in that position. As the implement is propelled over the ground and feed wheel 30 is rotated, roller 64 follows the inner contour of cam track 71. After the wheel has revolved 90 degrees to the position shown at the left in FIGURE 4, the roller 64 engages the outer surface of the lower cam track 72.

Due to the curvature of cam track 72, as roller 64 moves over the outer face thereof, bar 61 and finger 56 are moved radially outwardly until the shoulder 73 is reached, at which time the tape is ready to be deposited in the furrow and the finger 56 is projected rapidly outwardly against the action of a spring 74 anchored at one end to the plate 52 and at its other end to a clip 75 secured to clevis 59.

Although, for the sake of clarity, member 70 is shown in FIGURE 5 as separated from the body of the feed wheel, it may be understood that cam when roller 64 is in engagement with the track 71, roller 57 on finger 56 engages a peripheral flange 76 projecting inwardly from the body of the disk 70 and acting as a cam track.

In the position of the part shown in FIGURE 5, engagement of the outer edge of flange 76 with roller 57 at the top of the feed wheel holds the finger 56 in the position shown also against the bias of spring 74. Finger 56 is thus biased about the pivot 60 to the position shown at the bottom of FIGURE 5 away from the body of the wheel 33 and out of engagement with the seed tape. As the finger 56 grasping the tape rotates to a position approaching the bottom of the wheel during rotation thereof, roller 57 rides down an incline 77 on the cam track formed by the inner edge of the flange 76 and engages an offset portion 78 thereof allowing spring 74 to move finger 56 inwardly about its pivot 60 so that when the finger reaches the bottom of the wheel it is not only moved outwardly but swung away inwardly to release the tape and allow it to fall into the furrow.

As the wheel continues to rotate, roller 57 rides up the outer edge of flange 76 to urge finger 56 back into the position shown at the top in FIGURE 5. Roller 64 again engages the inner surface of cam track 71 and the finger 56 is retracted to again hold the tape to the wheel.

As pointed out hereinbefore, finger 56 remains retracted until roller 64 rides over the hump 73 when the finger reaches a position adjacent the ground line. This permits the cutting of the loop of tape formed when the hook 58 is pressed against the stop 68. Cutting the tape is done, for example, when turning the implement at the end of a field. Severance of the tape is accomplished by means designated at 79 comprising a cutting blade 80 carried at the lower end of a spindle 81 rotatably mounted in the flange 76. With the parts shown in FIGURE 5 brought together in their operating position, knife 80 is disposed between rim 37 and hook 58 as it rests against stop 68. Shortly before the finger 56 reaches its lowermost position on the feed wheel, the loop of tape is severed as it passes the knife. A spring 82 surrounding the spindle 81, anchored at one end to the member 80 and at its other end to an arm 83 affixed to spindle 81 normally biases the knife away from an operative position with respect to the tape. An opening 84 is provided in the arm 71 for the connection thereto of a cable, not shown, by which the operator of the vehicle which propels the planter unit can swing the knife 80 into a cutting position.

It is believed that the operation of the novel tape planting apparatus of this invention will be clearly understood from the foregoing description. It should likewise be understood, however, that the invention has been described in its preferred embodiment only, and that modifications may be made therein without departing from the spirit of the invention or the scope of the appended claims.

What is claimed is:

1. In a planter for seed tape and the like having a mobile frame, a supply of continuous tape carried by the frame, a ground-engaging feed wheel mounted on the frame, comprising a main body portion and a rim about a portion of the periphery of which the tape is wound, said wheel being adapted to withdraw the tape from the supply and deposit it on the ground by the rotation of the wheel, a peripherally toothed member carried by said main body portion laterally removed from said rim, a driving member mounted on the frame, an endless flexible member operatively connecting said driving member to said toothed member to drive the feed wheel, and lateral projections mounted on said flexible member extending across and engageable with said rim between the latter and the tape, said flexible member having a flight thereof between the feed wheel and the driving member parallel to and engageable with the ground, and the lateral projections on said flight being adapted to press the tape into the ground after the tape has been deposited by the wheel.

2. In a planter for seed tape and the like having a mobile frame, a supply of continuous tape carried by the frame, a ground-engaging feed wheel mounted on the frame, comprising a main body portion and a rim about a portion of the periphery of which the tape is wound, said wheel being adapted to withdraw the tape from the supply and deposit it on the ground by the rotation of the wheel, a peripherally toothed member carried by said main body portion laterally removed from said rim, a driving member mounted on the frame, an endless flexible member operatively connecting said driving member to said toothed member to drive the feed wheel, and lateral projections mounted on said flexible member extending across and engageable with said rim between the latter and the tape, said flexible member having a flight thereof between the feed wheel and the driving member parallel to and engageable with the ground, and the lateral projections on said flight being adapted to press the tape into the ground after the tape has been deposited by the wheel and coverer means mounted on the frame rearwardly of said feed wheel adapted to cover the tape with soil while it is engaged by the projections on said flexible member.

References Cited in the file of this patent

UNITED STATES PATENTS

| | | |
|---|---|---|
| 946,336 | Class | Jan. 11, 1910 |
| 1,292,082 | Sanford | Jan. 21, 1919 |
| 2,842,899 | Padrick | July 15, 1958 |

FOREIGN PATENTS

| | | |
|---|---|---|
| 283,035 | Great Britain | Jan. 5, 1928 |
| 207,353 | Australia | Mar. 7, 1957 |